(12) United States Patent
Kitayama

(10) Patent No.: US 12,124,897 B2
(45) Date of Patent: Oct. 22, 2024

(54) IMAGE FORMING APPARATUS THAT EFFECTIVELY SUPPRESSES FORMATION OF AN IMAGE

(71) Applicant: SHARP KABUSHIKI KAISHA, Sakai (JP)

(72) Inventor: Katsuya Kitayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/224,615

(22) Filed: Jul. 21, 2023

(65) Prior Publication Data

US 2024/0037360 A1 Feb. 1, 2024

(30) Foreign Application Priority Data

Jul. 26, 2022 (JP) .................................. 2022-118932

(51) Int. Cl.
*G06K 15/02* (2006.01)
*G06F 3/12* (2006.01)

(52) U.S. Cl.
CPC ......... *G06K 15/1806* (2013.01); *G06F 3/121* (2013.01); *G06F 3/1259* (2013.01); *G06F 3/1274* (2013.01); *G06F 3/1285* (2013.01)

(58) Field of Classification Search
CPC ... G06K 15/1806; G06F 3/121; G06F 3/1259; G06F 3/1274; G06F 3/1285
See application file for complete search history.

(56) References Cited

U.S. PATENT DOCUMENTS

| | | | | |
|---|---|---|---|---|
| 7,800,649 B2* | 9/2010 | Masumoto | ......... | H04N 1/00278 358/1.15 |
| 2001/0023438 A1* | 9/2001 | Ishida | ................ | H04N 1/00933 709/224 |
| 2004/0046991 A1* | 3/2004 | Kim | ...................... | G06F 3/1236 358/1.15 |
| 2008/0212124 A1* | 9/2008 | Hirama | .............. | H04N 1/32358 358/1.14 |

(Continued)

FOREIGN PATENT DOCUMENTS

| | | |
|---|---|---|
| JP | H08-016331 A | 1/1996 |
| JP | H08-310083 A | 11/1996 |
| JP | 2009-291983 A | 12/2009 |

*Primary Examiner* — Nicholas Pachol
(74) *Attorney, Agent, or Firm* — ScienBiziP, P.C.

(57) ABSTRACT

An image forming apparatus comprises a communicator that receives a print command of image data from a user terminal via a network; an image former that forms an image on the basis of the image data; and one or more controllers that control the communicator and the image former, wherein when a time-out period set in advance has elapsed without receiving a transmission completion notification of a print command from the user terminal after receiving the print command from the user terminal, the one or more controllers determine whether image data related to the print command is complete or not in accordance with a determination procedure set in advance, and when the one or more controllers determine that the image data is complete, the one or more controllers cause the image former to form an image based on the image data, while when the one or more controllers determine that the image data is not complete, the one or more controllers withhold execution of the print command.

5 Claims, 13 Drawing Sheets

(56) References Cited

U.S. PATENT DOCUMENTS

| | | | |
|---|---|---|---|
| 2012/0019860 A1* | 1/2012 | Fujiwara | H04N 1/46 |
| | | | 358/1.15 |
| 2012/0062930 A1* | 3/2012 | Toyazaki | G06F 3/1284 |
| | | | 358/1.14 |
| 2013/0070262 A1* | 3/2013 | Konno | G06F 3/1244 |
| | | | 358/1.6 |
| 2016/0364189 A1* | 12/2016 | Ogino | G06F 3/1211 |
| 2018/0246684 A1* | 8/2018 | Yamaguchi | G06F 3/1267 |

* cited by examiner

FIG. 4

```
%-12345X@PJL JOB NAME=" TEST PAGE "           ← TOP OF HEADER
@PJL SET PCNAMEW="B9Y15016L"
@PJL SET DRIVERNAME="SHARP MX-6171 PS¥1f42"   ← SPECIFIC HEADER
@PJL SET JOBNAME=" TEST PAGE "
@PJL SET SPOOLTIME="Thu, 17 Feb 2022 11:44:21 +0900"
@PJL SET USERNAMEW="S128325"
@PJL SET IPADDRESS="192.168.56.1:57863"
@PJL SET HOLD=OFF
@PJL SET QTY=999                              ← SPECIFICATION OF
                                                NUMBER OF COPIES
...
@PJL ENTER LANGUAGE=POSTSCRIPT                ← BACK END OF
                                                HEADER (PDL DATA)

-----
%-12345X@PJL SET ORIGINALCOUNTINFO=1          ← SPECIFIC FOOTER
@PJL EOJ NAME=" TEST PAGE "
%-12345X                                      ← BACK END OF
                                                FOOTER
```

FIG. 7

| ELAPSED TIME (sec) | ACQUIRED DATA SIZE (ACCUMULATED (KBytes)) | RECEPTION RATE (KBytes/sec) | AVERAGE RECEPTION RATE (KBytes/sec) |
|---|---|---|---|
| 0 | 0 | 0 | 0 |
| 0.01 | 10.24 | 1024 | 1024 |
| 0.02 | 20.48 | 1024 | 1024 |
| . . | . . | . . | . . |
| 1 | 1024 | 1024 | 1024 |
| . . | . . | . . | . . |
| 10 | 10240 | 1024 | 1024 |
| 10.01 | Session close | | |

FIG. 8

| ELAPSED TIME (sec) | ACQUIRED DATA SIZE (ACCUMULATED (KBytes)) | RECEPTION RATE (KBytes/sec) | AVERAGE RECEPTION RATE (KBytes/sec) |
|---|---|---|---|
| 0 | 0 | 0 | 0 |
| ... | ... | ... | ... |
| T(0)-60.0 | 61440 | 1024 | 1024 |
| ... | ... | ... | ... |
| T(0)-30.0 | 92160 | 1024 | 1024 |
| ... | ... | ... | ... |
| T(0)-1.0 | 121856 | 1024 | 1024 |
| ... | ... | ... | ... |
| T(0)-0.02 | 122860 | 1024 | 1024 |
| T(0)-0.01 | 122870 | 1024 | 1024 |
| T(0) | 0 | 0 | 0 |
| ... | ... | ... | ... |
| T(0)+Timeout | 0 | 0 | 0 |

FIG. 9

| ELAPSED TIME (sec) | ACQUIRED DATA SIZE (ACCUMULATED(KBytes)) | RECEPTION RATE (KBytes/sec) | AVERAGE RECEPTION RATE (KBytes/sec) |
|---|---|---|---|
| 0 | 0 | 0 | 0 |
| ... | ... | ... | ... |
| T(0)-60.0 | 60000 | 100 | 980 |
| ... | ... | ... | ... |
| T(0)-30.0 | 63000 | 50 | 100 |
| ... | ... | ... | ... |
| T(0)-10.0 | 63200 | 10 | 10 |
| ... | ... | ... | ... |
| T(0)-3.0 | 63235 | 5 | 5 |
| ... | ... | ... | ... |
| T(0)-2.0 | 63237 | 2 | 2 |
| ... | ... | ... | ... |
| T(0)-1.0 | 63238 | 1 | 1 |
| ... | ... | ... | ... |
| T(0)-0.02 | 63239 | 1 | 1 |
| T(0)-0.01 | 63239 | 1 | 1 |
| T(0) | 0 | 0 | 0 |
| ... | ... | ... | ... |
| T(0)+Timeout | 0 | 0 | 0 |

IMAGE FORMING APPARATUS THAT EFFECTIVELY SUPPRESSES FORMATION OF AN IMAGE

CROSS-REFERENCE TO RELATED APPLICATION

The present application claims priority from Japanese Application JP2022-118932, the content of which is hereby incorporated by reference into this application.

BACKGROUND

1. Field

This disclosure relates to an image forming apparatus.

2. Description of the Related Art

Conventionally, in an image forming apparatus such as a multifunction peripheral (MFP), only one part of print data is sent from a user terminal such as a personal computer (PC) to the image forming apparatus, and a plural number of copies are printed by the unit of copies in some cases.

For example, in the ROPM (RIP Once Print Multi) method, after RIP (analyzing) of a part of print data received from the user terminal, the RIPed data is stored in a storage area such as an HDD of the image forming apparatus, and this is repeated and thrown into a print engine to print the plural number of copies.

In the image forming apparatus as described above, if the print data is interrupted during reception of the print data from the user terminal, a time-out period set in advance may elapse without the image forming apparatus receiving a session close (completion notification of transmission data) from the user terminal.

As a result, if the interrupted print data is determined to be incomplete on the basis of the analysis results of the image forming apparatus, a time-out error occurs.

In order to handle the problem as above, such a method of printing a plural number of copies is conventionally known that, if an error occurs during processing of data input from a host machine in a plural-copy printing mode, only a first copy is printed and such a display is performed that allows an operator to select whether or not to continue the printing of the remaining copies, and the remaining copies are printed only when the continuation is selected.

Moreover, such a printing device is known, characterized by including a job-continuation inquirer that inquires a data supply source whether or not a job being executed may be discarded when a time-out error occurs and a job discard determiner that determines whether the job being executed is to be discarded by a job discard executer on the basis of status information from the data supply source in response to the inquiry by this job-continuation inquirer.

Furthermore, such an image forming apparatus is known, characterized by having a setting acceptor that accepts each setting of a limit time for waiting for resumption to start reception of transmission data again after the transmission data is interrupted since the image forming apparatus started reception of the transmission data from an outside device by a communicator and the limit time of print processing from start to end of a print operation by the image forming apparatus by reception of a setting command by the communicator and an input operation on an operation panel, and one or more controllers that control the print operation in accordance with the limit time accepted by the setting acceptor.

SUMMARY

By the way, on the basis of the analysis results of the image forming apparatus, though the print result is different from the complete print data such that a part of an image is missing, the interrupted print data is not determined to be incomplete in some cases. In this case, the image forming apparatus stores the print data in an HDD as it is for ROPM.

Thus, even if the print data stored by the ROPM is incomplete, the image forming apparatus prints the specified number of copies.

Moreover, when a time-out error occurs, the user terminal resends the print data in some cases, assuming that the transmission of the print data was not completed correctly. In this case, if a time-out occurs again in the resent print data, the above problem is repeated.

On the other hand, there are such cases that the print data is complete even if a time-out error occurs.

For example, it is such a case where a user terminal finishes sending complete print data to the image forming apparatus and then times out without sending a session close.

In this case, however, the user cannot make an appropriate decision in some cases, since there is no material for the user to determine whether or not the printing should be continued at the time-out.

Therefore, when the user cancels the printing, the printing is cancelled even when the user terminal transmits complete data to the image forming apparatus.

This disclosure was made in view of the circumstances as described above and provides an image forming apparatus that suppresses formation of an image in a state different from the user's intension more effectively than before, when the time-out occurs after image data is interrupted while reception of the image data related to a print command.

The image forming apparatus according to this disclosure includes a communicator that receives a print command of image data from a user terminal via a network, an image former that forms an image on the basis of the image data, and one or more controllers that control the communicator and the image former, characterized in that when a time-out period set in advance has elapsed without receiving a transmission completion notification of the print command from the user terminal after receiving the print command from the user terminal, the one or more controllers determine whether image data related to the print command is complete or not in accordance with a determination procedure set in advance, and when the one or more controllers determine that the image data is complete, it causes the image former to form an image based on the image data, while when it determines that the image data is not complete, execution of the print command is withheld.

According to this disclosure, such an image forming apparatus is realized that suppresses formation of an image in a state different from the user's intention more effectively than before, when a time-out occurs after image data is interrupted during reception of the image data related to a print command.

BRIEF DESCRIPTION OF THE DRAWINGS

FIG. 4 is an explanatory diagram illustrating an example of print data for a plural number of copies in a digital multifunction machine in FIG. 1.

FIG. 7 is a table illustrating an example of a record of reception rates of the print data received by the digital multifunction machine in FIG. 1.

FIG. 8 is a table illustrating another example of a record of reception rates of the print data received by the digital multifunction machine in FIG. 1.

FIG. 9 is a table illustrating still another example of a record of the reception rates of the print data received by the digital multifunction machine in FIG. 1.

DESCRIPTION OF EMBODIMENTS

Figure 1:
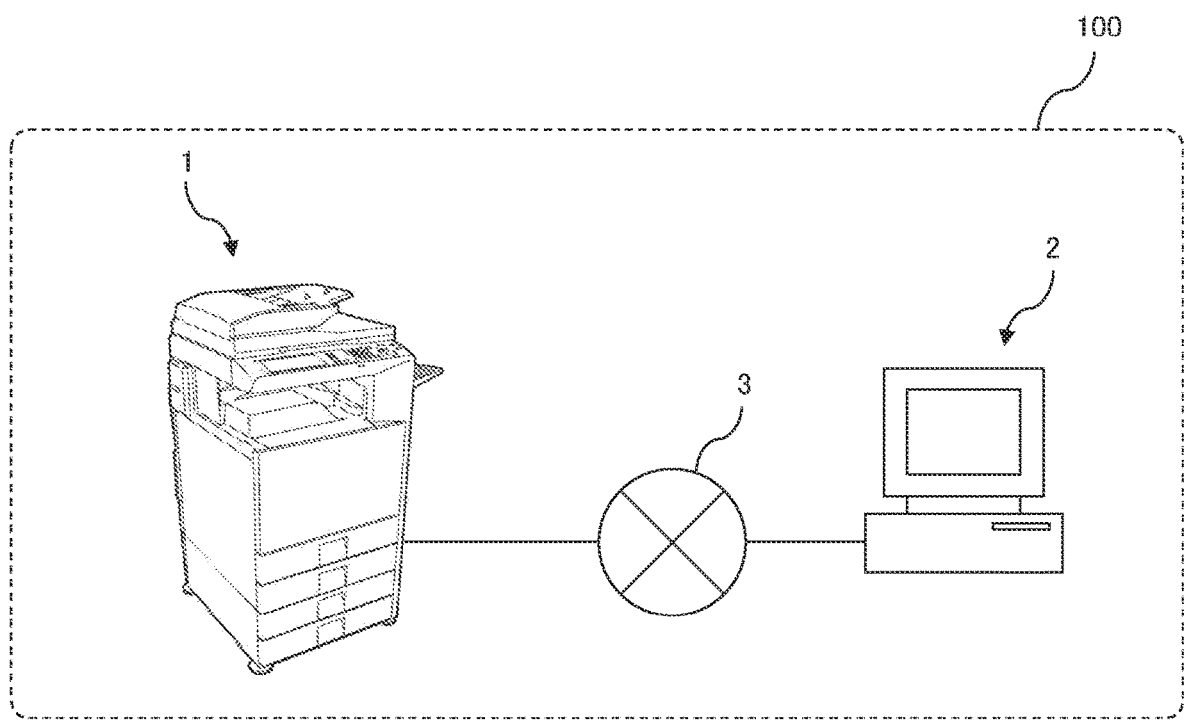
FIG. 1 is an explanatory diagram illustrating an example of a configuration of an image forming system including a digital multifunction machine of this disclosure.

In this disclosure, the "image forming apparatus" is a device that forms and outputs an image, including a copying machine or a multifunction machine having a copying (copy function) function such as a printer using an electrophotographic method for image forming with toner, an MFP including functions other than the copying or the like.

The "user terminal" is not limited to a personal computer (PC), but can also be a mobile information terminal such as a smartphone and a tablet, an electronic blackboard, an information display and the like.

Preferred modes of this disclosure will be described.

In the image forming apparatus of this disclosure, the controller may determine whether image data related to the print command is complete or not on the basis of whether the image data includes a specific header and specific footer set in advance.

By configuring as above, such an image forming apparatus can be realized that, when a time-out occurs after image data is interrupted during reception of the image data related to a print command, suppresses formation of an image in a state different from a user's intention more effectively than before by determining whether the image data is complete or not on the basis of whether predetermined specific header and specific footer are included or not.

In the image forming apparatus of this disclosure, the controller may be such that, when the image data includes the specific header and the specific footer, the controller determines that the image data is complete, while when the image data does not include the specific footer, the controller determines that the image data is not complete.

By configuring as above, such an image forming apparatus can be realized that, when a time-out occurs after image data is interrupted during reception of the image data related to a print command, suppresses formation of an image in a state different from a user's intention more effectively than before by determining that the image data is complete when the predetermined specific header and specific footer are included and by determining that the image data is not complete when the specific footer is not included.

In the image forming apparatus of this disclosure, one or more storages that hold various types of data related to image formation is further provided, and it may be configured such that the controller calculates a reception rate of the image data related to the print command and causes the one or more storages to hold it, and when the image data does not include the specific header, by referring to a history of the reception rate from a point of time when measurement of the time-out period is started, which is stored in the one or more storages, if the reception rate has remained at or above an allowable value set in advance during the predetermined time period, the controller determines that the image data is complete and otherwise determines that the image data is not complete.

By configuring as above, such an image forming apparatus can be realized that, when a time-out occurs after image data is interrupted during reception of the image data related to a print command, suppresses formation of an image in a state different from a user's intention more effectively than before by determining whether the image data is complete or not on the basis of the history of the reception rate during the predetermined period of time, when the predetermined specific header is not included.

In the image forming apparatus of this disclosure, the controller may be configured to determine whether the print command received from the user terminal relates to specification of printing of a plural number of copies or not, and when the print command specifies the printing of the plural number of copies and the time-out period has elapsed without receiving a transmission completion notification of the print command from the user terminal, it determines whether the image data is complete or not on the basis of the determination procedure.

By configuring as above, such an image forming apparatus can be realized that, when a time-out occurs after image data is interrupted during reception of the image data related to a print command, suppresses formation of an image in a state different from a user's intention more effectively than before by determining whether the image data is complete or not only when the print command specifies printing of a plural number of copies.

In the image forming apparatus of this disclosure, the controller may be configured to cancel execution of the print command and to discard the image data related to the print command after a holding time set in advance has elapsed after the execution of the print command was withheld.

By configuring as above, such an image forming apparatus can be realized that suppresses the formation of an images in a state different from the user's intention more effectively than before by canceling the execution of the print command after a predetermined holding time has elapsed after the execution of the print command was withheld by assuming that the image data is not complete.

In the image forming apparatus of this disclosure, the controller may be configured such that, when the communicator receives subsequent image data during a period until the holding time has elapsed after execution of the print command was withheld, the controller compares the subsequent image data with the image data related to the withheld print command, and if it determines that they are identical, it discards the image data related to the withheld print command by assuming that the subsequent image data is image data resent and related to the withheld print command and determines whether the subsequent image data is complete or not.

By configuring as above, such an image forming apparatus can be realized that suppresses formation of an image in a state different from a user's intention more effectively than before by determining whether the image data is the resent image data related to the withheld print command or not, when subsequent image data is received during a period until the predetermined holding time has elapsed after execution of the print command was withheld by assuming that the image data is not complete.

In the image forming apparatus of this disclosure, a display that displays various types of information to the user and an operation acceptor that accepts a command from the user are further provided, and it may be configured such that, when the controller determines that image data related to the print command is not complete, it causes the display to display a message determined in advance, and the operation acceptor accepts a command from the user as to whether the execution of the print command should be canceled or not.

By configuring as above, such an image forming apparatus can be realized that suppresses formation of an image in a state different from the user's intention more effectively than before, when it is determined that the image data related to the print command is not complete, by causing a message to that effect to be displayed on the display and by accepting a command from the user as to whether the print command should be canceled or not.

Hereinafter, this disclosure will be described in more detail with reference to the drawings. Note that, the following explanation is exemplification in all respects and should not be construed to limit this disclosure.

Embodiment 1

Schematic Configuration of Image Forming System 100

A digital multifunction machine 1 that is one embodiment of an image forming apparatus of this disclosure will be explained on the basis of FIGS. 1 to 3.

FIG. 1 is an explanatory diagram illustrating an example of a configuration of an image forming system 100 including the digital multifunction machine 1 of this disclosure.

Figure 2:
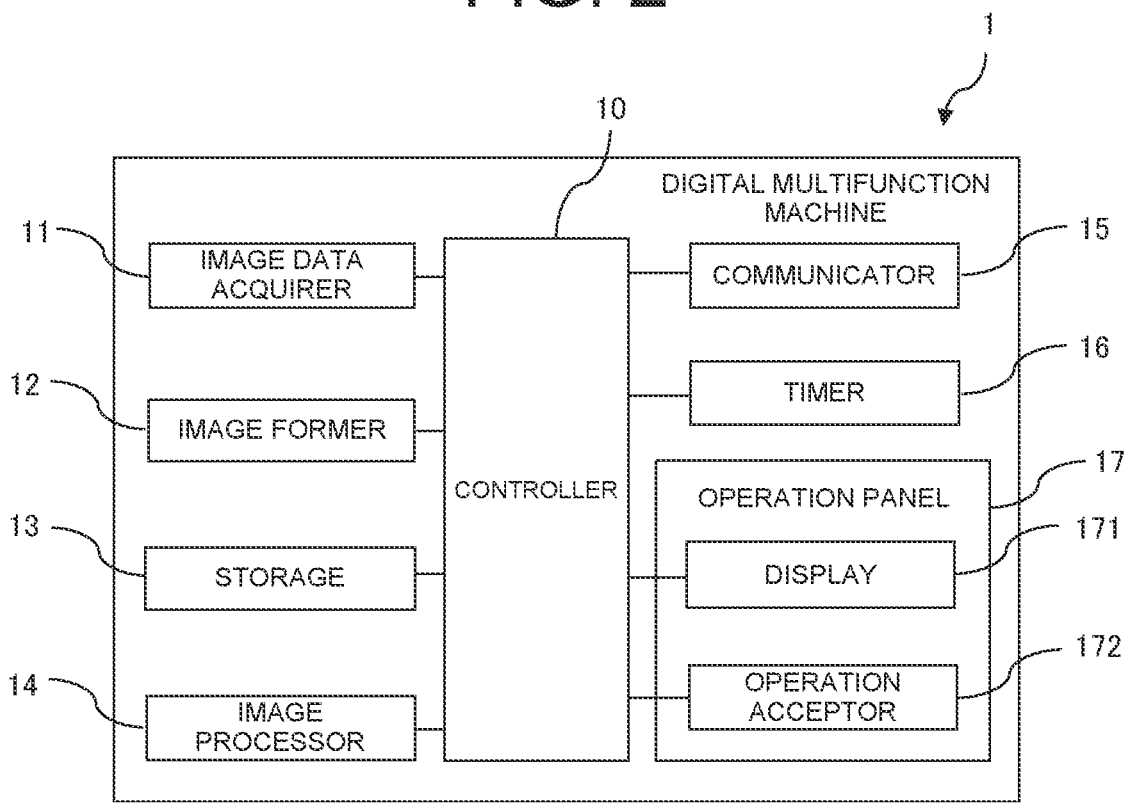
FIG. 2 is a block diagram illustrating a schematic configuration of the digital multifunction machine in FIG. 1.

FIG. 2 is a block diagram illustrating a schematic configuration of the digital multifunction machine 1 in FIG. 1.

Figure 3:
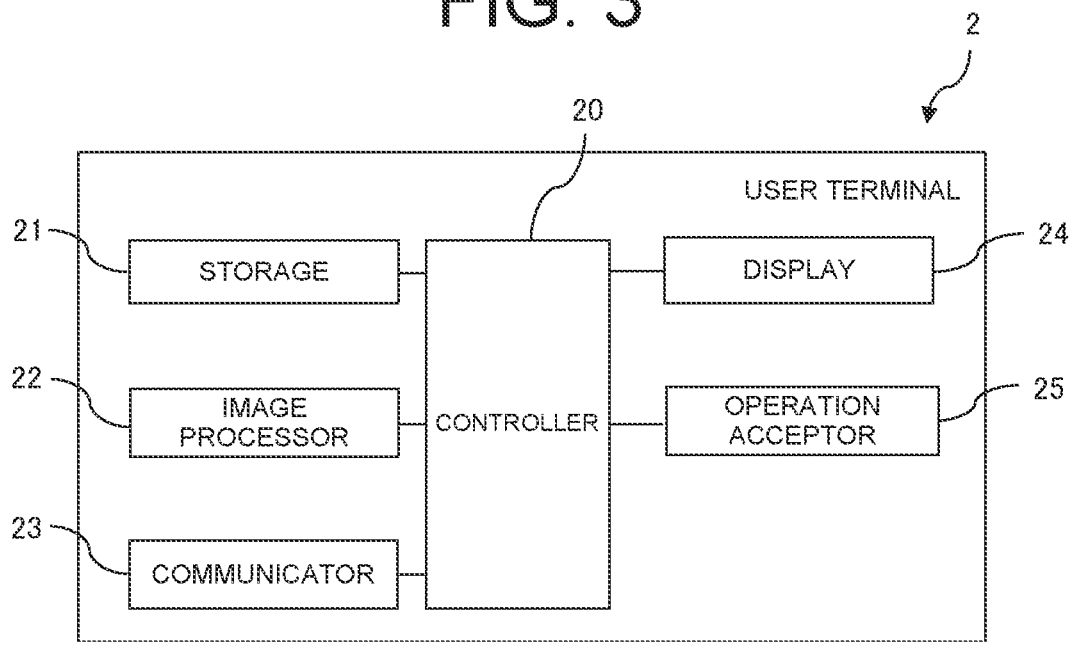
FIG. 3 is a block diagram illustrating a schematic configuration of a user terminal in FIG. 1.

FIG. 3 is a block diagram illustrating a schematic configuration of a user terminal 2 in FIG. 1.

As shown in FIG. 1, in the image forming system 100 of this disclosure, a digital multifunction machine 1 is connected to the user terminal 2 in a wired manner or via a wireless network 3.

The digital multifunction machine 1 is an apparatus such as a multifunction machine or an MFP (Multifunction Peripheral: multifunction peripheral device) that digitally processes image data and has a copy function, a printer function, a scanner function, and a facsimile function.

The user terminal 2 is a terminal such as a personal computer (PC) and a tablet or a mobile terminal such as a smartphone.

The user terminal 2 transmits and receives image data to and from the digital multifunction machine 1 via a network 3.

Schematic Configuration of Digital Multifunction Machine 1

Subsequently, on the basis of FIG. 2, a schematic configuration of the digital multifunction machine 1 will be explained.

FIG. 2 is a block diagram illustrating a schematic configuration of the digital multifunction machine 1 shown in FIG. 1.

As shown in FIG. 2, the digital multifunction machine 1 includes a controller 10, an image data acquirer 11, an image former 12, a storage 13, an image processor 14, a communicator 15, a timer 16, and an operation panel 17.

Hereinafter, each of constituent elements of the digital multifunction machine 1 will be explained.

The controller 10 comprehensively controls the digital multifunction machine 1 and includes a CPU (Central Processing Unit), a RAM (Random Access Memory), a ROM (Read Only Memory), various interface circuits and the like.

The controller 10 performs detection of each sensor and monitoring/control of all loads such as a motor, a clutch, the operation panel 17 and the like in order to control an entire operation of the digital multifunction machine 1.

The image data acquirer 11 is a part that detects and reads a document placed on a document table or a document conveyed from a document tray and generates image data.

The image former 12 is a part that prints out image data, which is acquired by the image data acquirer 11 and is processed by the image processor 14, onto a sheet.

The storage 13 is an element or a storage medium that stores information required to realize the various functions of the digital multifunction machine 1, a control program and the like. For example, a semiconductor device such as a RAM or a ROM, a storage medium such as a hard disk, a flash storage, or an SSD (Solid State Drive), is used.

The storage 13 stores intermediate data such as information related to a job command (print job) such as printing and internal data (work memory) required for job execution such as image data.

Moreover, the storage 103 has a spool area for temporarily storing print/FAX data.

Note that the program and the data may be held in different devices such that an area holding data is constituted by a hard disk drive and an area holding a program is constituted by a flash storage.

The image processor 14 is a part that executes processing by converting the image data input from the image data acquirer 11 to an appropriate electric signal so as to be suitable for output such as enlargement, reduction and the like on the basis of analysis results of a job command of printing and the like acquired from the user terminal 2 and the like via the communicator 15 and a job command of printing and the like input from the operation acceptor 162.

The communicator 15 is a part that conducts communication with external devices such as the user terminal 2 and the like via the network 3, and transmits/receives data and the like to/from these external devices.

The timer 16 is a part that measures and counts time and acquires a time through a built-in clock or the network 3, for example.

The operation panel 17 is constituted by a display panel constituted by a liquid crystal panel or the like and a touch panel of a capacitive touch panel or the like that is stacked and placed on the display panel and detects a position touched by a finger, and the operation panel 17 includes a display 171 and an operation acceptor 172.

The display 171 is a part that displays various types of information.

The display 171 is constituted by a CRT display, a liquid crystal display, an EL display or the like, for example, and is a display device such as a monitor, a line display or the like for an operating system or application software to display electronic data such as a processing state.

The controller 10 causes an operation and a state of the digital multifunction machine 1 to be displayed through the display 171.

The operation acceptor 172 is an interface for operating the digital multifunction machine 1 and is a part that accepts a command from a user.

Schematic Configuration of User Terminal 2

Subsequently, a schematic configuration of the user terminal 2 will be explained on the basis of FIG. 3.

As shown in FIG. 3, the user terminal 2 includes a controller 20, a storage 21, an image processor 22, a communicator 23, a display 24, and an operation acceptor 25.

Hereinafter, each constituent element of the user terminal 2 will be explained.

The controller 20 is a part that comprehensively controls the user terminal 2 and includes a CPU, a RAM, a ROM, various interface circuits and the like.

The storage 21 is an element or a storage medium that stores information required for realizing various functions of the user terminal 2, a control program and the like. For example, a semiconductor device such as a RAM or a ROM, a storage medium such as a hard disk, a flash storage, an SSD and the like is used.

The image processor 22 is a part that converts image data to be displayed on the display 24 into an appropriate electric signal and processes it so as to be suitable for output such as enlargement, reduction and the like on the basis of an operation instruction from the operation acceptor 25.

The communicator 23 is a part that communicates with the digital multifunction machine 1 via the network 3 and transmits/receives data and the like such as setting information required for the print.

The display 24 is a part that displays various types of information of the user terminal 2.

The operation acceptor 25 is an interface for operating the user terminal 2 and a part that accepts a command from the user.

Note that the display 24 and the operation acceptor 25 may be realized by a display panel constituted by a liquid crystal panel or the like and a touch panel such as a capacitive touch panel that is stacked and placed on the display panel and detects the position touched by a finger.

Example of Processing of Print Data in Digital Multifunction Machine 1 of Embodiment 1 of this Disclosure Subsequently, on the basis of FIGS. 4 to 9, an example of processing of print data in the digital multifunction machine 1 of Embodiment 1 of this disclosure will be explained.

FIG. 4 is an explanatory diagram illustrating an example of print data for a plural number of copies for the digital multifunction machine 1 in FIG. 1.

The printing of the digital multifunction machine 1 is generally performed by generating print data through software (printer driver) pre-installed in the user terminal 2 for printing on the digital multifunction machine 1 and transmitting it to the digital multifunction machine 1.

The print data generated by the printer driver generally has a header and a footer called PJL (Printer Job Language) related to control of the entire job control.

Moreover, it has PDL (Print Description Language) data that describes print contents of each page in a form sandwiched by the PJL.

The PJL header is generally configured in the form sandwiched by PJL commands indicating a beginning and a rear end of the PJL header.

In the example in FIG. 4, "%-12345X@PJL JOB NAME="test page"" is the PJL command indicating the beginning of the PJL header.

The PJL footer is generally configured by the PJL command indicating a rear end of the PJL footer.

In the example in FIG. 4, "%-12345X" is the PJL command indicating the rear end of the PJL footer.

The specification of the plural number of copies is generally made in the form of a PJL command in the PJL header, though some are specified by the print data in the PDL data. In the example in FIG. 4, "@PJL SET QTY=999" is the PJL command specifying the number of copies.

The PJL header and the PJL footer can include vendor-specific PJL commands generated by the printer driver.

In the example in FIG. 4, "@PJL SET DRIVERNAME" in the PJL header and "@PJL SET ORIGINAL-COUNTINFO" in the PJL footer are vendor-specific PJL commands.

The PDL data is a specific command sequence such as PostScript or PCLXL, for example.

While the print data generated by the printer driver is as described above, some print data which is sent to the printing device do not have the format described above, for example, in the case of directly printing PDF or TIFF.

Figure 5:
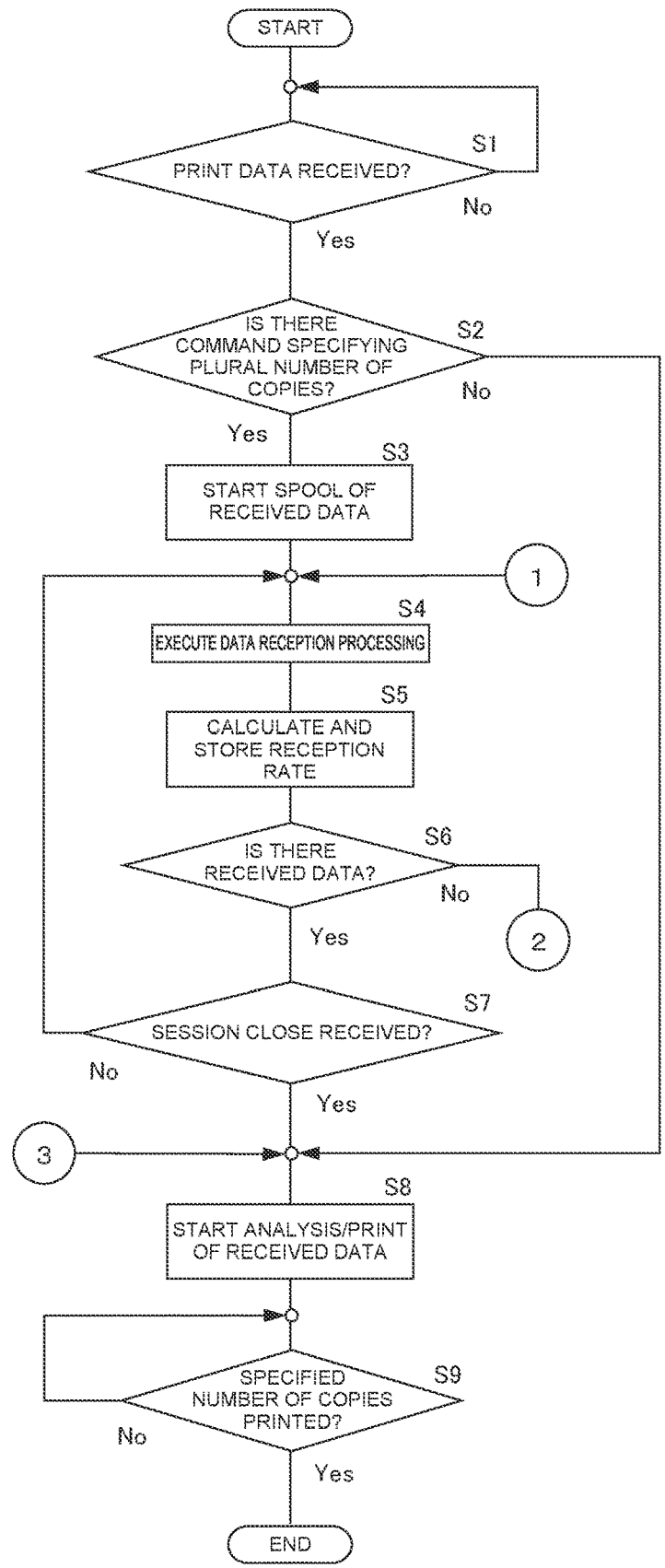
FIG. 5 is a flowchart illustrating processing of the print data in the digital multifunction machine in FIG. 1.
Figure 6:
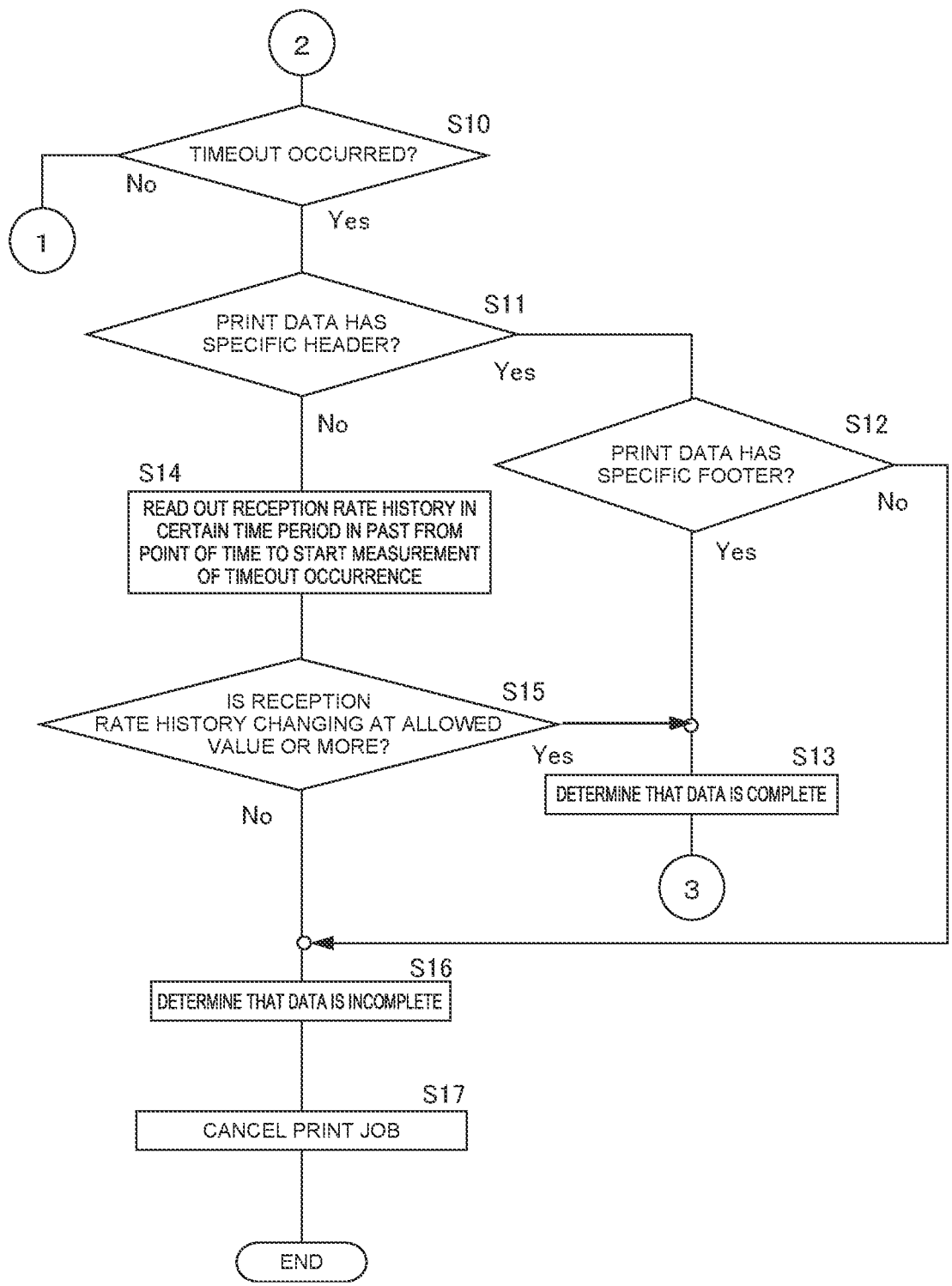
FIG. 6 is a flowchart illustrating processing of the print data in the digital multifunction machine in FIG. 1.

FIGS. 5 and 6 are flowcharts illustrating processing of print data in the digital multifunction machine 1 in FIG. 1.

In Embodiment 1, assume the case where print data is sent from the user terminal 2 to the digital multifunction machine 1 to execute printing of images.

At Step S1 in FIG. 5, the controller 10 of the digital multifunction machine 1 determines whether the communicator 15 has received print data from the external user terminal 2 or not (Step S1).

When the communicator 15 receives the print data from the external user terminal 2 (when the determination at Step S1 is Yes), at Step S2, the controller 10 determines whether the received print data includes a command specifying a plural number of copies or not (Step S2).

Specifically, as shown in FIG. 4, the controller 10 analyzes the PJL header of the print data and searches presence/absence of the PJL command "@PJL SET QTY=999" specifying the number of copies.

If the received print data does not have a command specifying the plural number of copies or even if there is a command specifying a plural number of copies but in the case of only a partial specification (when the determination at Step S2 is No), at Step S8, the received print data is analyzed and the image data related to the printing concerned is processed by the image processor 14, and the image former 12 is caused to start printing (Step S8).

At the subsequent Step S9, the controller 10 determines whether all the specified number of copies have been printed or not (Step S9).

When all the specified number of copies have been printed (when the determination at Step S9 is Yes), the controller 10 ends the processing.

On the other hand, at Step S2, if the received print data has a command specifying the plural number of copies (two or more copies) (when the determination at Step S2 is Yes), at Step S3, the controller 10 starts storing the received print data in the spool area of the storage 13 (Step S3).

At the subsequent Step S4, the controller 10 executes reception processing of the print data (Step S4).

Moreover, at Step S5, the controller 10 calculates a reception rate and stores it in the storage 13 (Step S5).

FIG. 7 is a table illustrating an example of a record of the reception rates of the print data received by the digital multifunction machine 1 in FIG. 1.

Specifically, this is an example of the record of the reception rates from the start of reception to the completion of the reception of all the data and reception of session close for the print job for a certain plural number of copies.

Here, it is assumed that the communicator 15 is capable of data reception normally at 1024 KB/sec as the maximum performance by reception polling of the print data every 10 ms (0.01 sec).

In this case, the controller 10 calculates the cumulative reception size every 10 ms (0.01 sec) from the start of reception and records it in the storage 13.

In the example in FIG. 7, elapsed time (sec) is 0, 0.01, 0.02, . . . , 1, . . . , 10 and the acquired data size (cumulative (KBytes)) is 0, 10.24, 20.48, . . . , 1024, . . . , 10240, respectively.

The controller 10 also calculates the reception rate (every 10 ms) and an average reception rate (for the entire period) using the cumulative reception size and records them in the storage 13.

Note that the average reception rate may be a moving average over a certain period of time.

In the example in FIG. 7, the reception rate (KBytes/sec) is 1024 and the average reception rate (KBytes/sec) is also 1024.

Subsequently, at Step S6 in FIG. 5, the controller 10 determines whether there is print data received by the communicator 15 or not (Step S6).

If there is print data received by the communicator 15 (when the determination at Step S6 is Yes), at Step S7, the controller 10 determines whether a session close has been received or not (Step S7).

If the session close has not been received (when the determination at Step S7 is No), the controller 10 returns the processing to Step S4.

On the other hand, if the session close is received (when the determination at Step S7 is Yes), the controller 10 analyzes the received print data at Step S8, causes the image processor 14 to process the image data related to the printing, and causes the image former 12 to start the printing (Step S8).

In the example in FIG. 7, the printing is completed normally because the print data is received without interruption at 1024 KB/sec from the start of the print data reception, and the session close is received at the elapsed time (10.01 sec).

On the other hand, if there is no print data received by the communicator 15 at Step S6 (when the determination at Step S6 is No), the controller 10 determines whether a time-out has occurred or not at Step S10 in FIG. 6 (Step S10).

If no time-out has occurred (the determination at Step S10 is No), the controller 10 returns the processing to Step S4 in FIG. 5.

On the other hand, if a time-out has occurred (when the determination at Step S10 is Yes), at Step S11, the controller 10 determines whether there is a specific header in the spool data of the print data or not (Step S11).

If there is a specific header in the spool data of the print data (when the determination at Step S11 is Yes), at Step S12, the controller 10 determines whether there is a specific footer in the spool data of the print data or not (Step S12).

If there is a specific footer in the spool data of the print data (when the determination at Step S12 is Yes), at Step S13, the controller 10 determines that the print data is complete (Step S13).

After that, the controller 10 analyzes the received print data, causes the image processor 14 to process the image data related to the printing, and causes the image former 12 to start printing at Step S8 in FIG. 5 (Step S8).

On the other hand, if there is no specific footer in the spool data of the print data (when the determination at Step S12 is No), at Step S16, the controller 10 determines that the print data is not complete (Step S16).

If there is no specific header in the spool data of the print data (when the determination at Step S11 is No), at Step S14, the controller 10 reads the reception rate history for a certain period of time in the past from a point of time when the time-out occurrence measurement was started (Step S14).

At the subsequent Step S15, the controller 10 determines whether the reception rate history has remained at or above a predetermined allowable value or not (Step S15).

If the reception rate history has not remained at or above the predetermined allowable value (when the determination at Step S15 is No), at Step S13, the controller 10 determines that the print data is complete.

FIG. 8 is a table illustrating another example of a record of the reception rates of the print data received by the digital multifunction machine 1 in FIG. 1.

In the example in FIG. 8, for the print job for a plural number of copies, though data was received at 1024 KB/sec from the start of reception, the size of the acquired print data became 0 at time T(0), and from then until time T(0)+Timeout when the time-out period set in advance has elapsed, the size of the acquired print data remains 0 all the time without receiving a session close.

In this case, the print data is received at 1024 KB/sec before the time T(0). The history of received data shifts as above in some cases, when the user terminal 2 sends all the print data to the digital multifunction machine 1 but does not send a session close for some reason.

In this case, if a time-out occurs at time T(0)+Timeout, the controller 10 checks the reception rate by going backward by the time set in advance from the time T(0), when the measurement of the time-out elapsed time Timeout was started.

In other words, the system checks whether the reception rate has been at or above or below the allowable value set in advance of the reception rate.

For example, it is assumed that the reception rate in a section by going backward by 60 sec from the time T(0) is determined to be the allowable value of 100 KB/sec, which is approximately 10% of the maximum capacity.

At this time, in the example in FIG. 8, the reception rate is constant at 1024 KB/sec all the time in the section from time T(0)-60.0 sec to the time T(0) and thus, the controller 10 regards that the reception was normal and determines that the received data is complete (when the determination at Step S15 is Yes).

On the other hand, if the reception rate history has been below the predetermined allowable value (when the determination at Step S15 is No), at Step S16, the controller 10 determines that the print data is not complete.

FIG. 9 is a table illustrating still another example of a record of the reception rates of the print data received by the digital multifunction machine 1 in FIG. 1.

In the example in FIG. 9, in the print job for a certain plural number of copies, though the data was received at 1024 KB/sec from the start of reception, the size of the received print data decreased from around a certain time T(0)−60s.

Then, at the time T(0), the size of the acquired print data becomes 0, and from then until the time T(0)+Timeout when the time-out period set in advance has elapsed, the size of the acquired print data remains 0 all the time without receiving a session close.

In the example in FIG. 9, since the reception rate is always below 100 KB/sec in the section from the time T(0)−60.0 sec to the time T(0), the controller 10 regards that abnormality has occurred in reception and the data reception has stopped, and determines that the received data is not complete.

Note that the above determination method is only an example, and the controller 10 may use not only whether the reception rate in the set section is at or above the allowable value or not, but also a transition status of the reception rate such as the average reception rate or a moving average of the reception rate as a determination material.

Subsequently, if it is determined that the print data is not complete at Step S16, the controller 10 cancels the received print job at Step S17 (Step S17).

Note that the controller 10 may be configured to display a message on the display 171 that the print job was canceled since the print data is not complete.

As described above, such a digital multifunction machine 1 can be realized that, when a time-out occurs after the print data is interrupted during reception of print data for a plural number of copies, the printing of the print data in the plural number of copies in a state different from the user's intention is suppressed more effectively than before.

Embodiment 2

Subsequently, on the basis of FIGS. 10 to 12, an example of processing of print data in the digital multifunction machine 1 of Embodiment 2 of this disclosure will be explained.

The schematic configuration of the image forming system 100 according to Embodiment 2 is similar to that of Embodiment 1 (FIGS. 1 to 3) and thus, explanation will be omitted.

Figure 10:
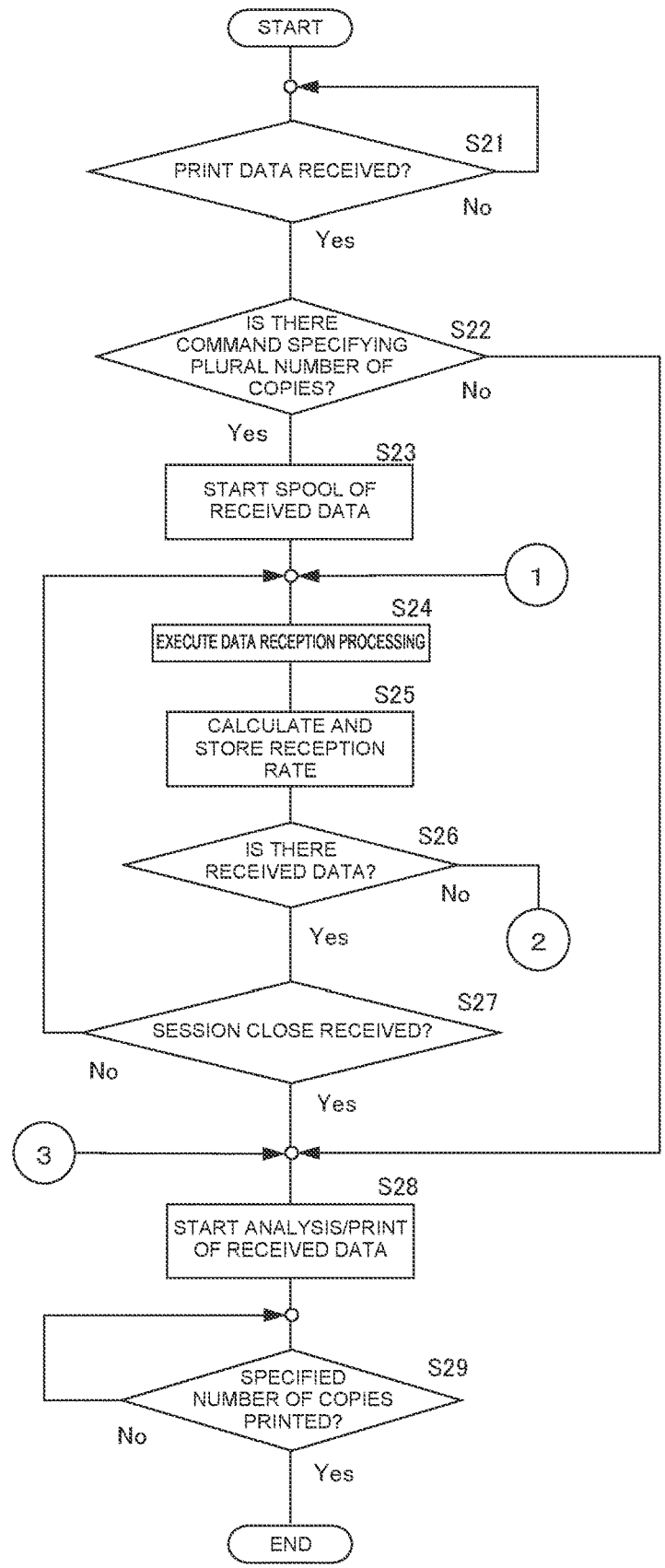
FIG. 10 is a flowchart illustrating processing of the print data in the digital multifunction machine according to an embodiment 2 of this disclosure.
Figure 11:
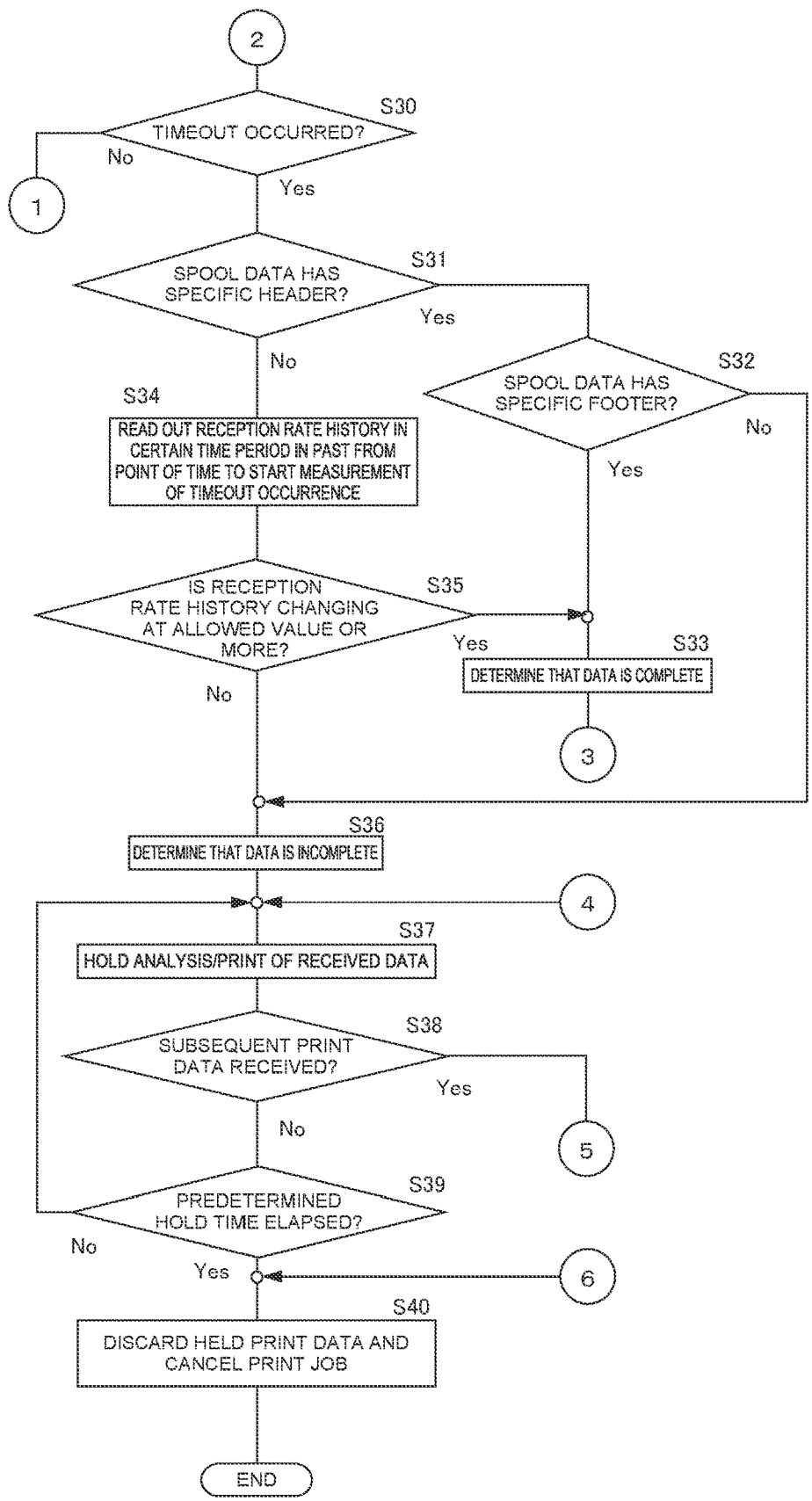
FIG. 11 is a flowchart illustrating the processing of the print data in the digital multifunction machine according to the embodiment 2 of this disclosure.
Figure 12:
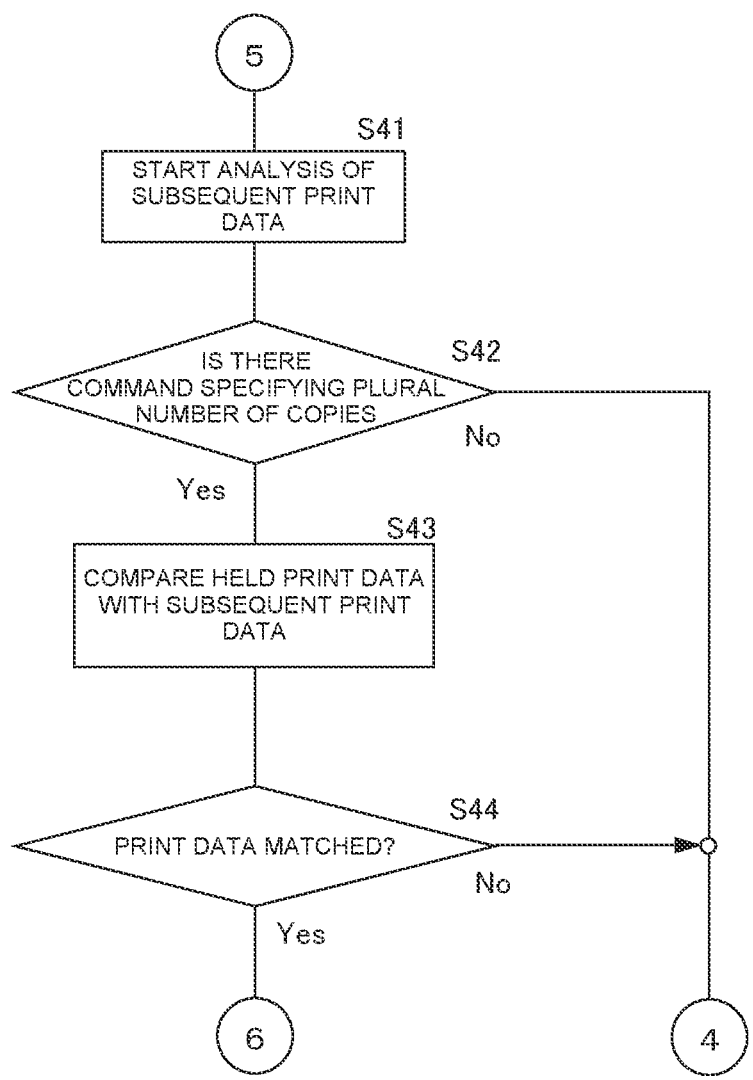
FIG. 12 is a flowchart illustrating the processing of the print data in the digital multifunction machine according to the embodiment 2 of this disclosure.

FIGS. 10 to 12 are flowcharts illustrating the processing of print data in the digital multifunction machine 1 according to Embodiment 2 of this disclosure.

Since processing at Steps S21 to S29 in FIG. 10 and at Steps S30 to S36 in FIG. 11 correspond to the processing at Steps S1 to S9 in FIG. 5 and at Steps S10 to S16 in FIG. 6, respectively, explanation will be omitted.

Here, processing at Step S37 in FIG. 11 and after, which is not described in Embodiment 1, will be explained.

If it is determined that the print data is not complete at Step S36 in FIG. 11, at Step S37, the controller 10 withholds analysis and printing of the received print data (Step S37).

At subsequent Step S38, the controller 10 determines whether the communicator 15 has received subsequent print data or not (Step S38).

If the communicator 15 has not received the subsequent print data (when the determination at Step S38 is No), at Step S39, the controller 10 determines whether the predetermined holding time has elapsed or not (Step S39).

If the predetermined holding time has not elapsed (when the determination at Step S39 is No), the controller 10 returns the processing to Step S37.

On the other hand, when the predetermined holding time has elapsed (when the determination at Step S39 is Yes), at Step S40, the controller 10 discards the withheld print data, cancels the print job related to the print data (Step S40), and ends the processing.

On the other hand, if the communicator 15 receives a subsequent print job at Step S38 (when the determination at Step S38 is Yes), the controller 10 starts analysis of the subsequent print job at Step S41 in FIG. 12 (Step S41).

Subsequently, at Step S42, the controller 10 determines whether there is a command specifying a plural number of copies in the subsequent print data or not (Step S42).

If there is no command specifying a plural number of copies in the subsequent print data (the determination at Step S42 is No), the controller 10 returns the processing to Step S37 in FIG. 11.

On the other hand, if there is a command specifying the plural number of copies in the subsequent print data (when the determination at Step S42 is Yes), at Step S43, the controller 10 compares the withheld print data with the subsequent print data (Step S43).

At subsequent Step S44, the controller 10 determines whether the withheld print data matches the subsequent print data or not (Step S44).

If the withheld print data does not match the subsequent print data (when the determination at Step S44 is No), the controller 10 returns the processing to Step S37 in FIG. 11.

If the withheld print data matches the subsequent print data (when the determination at Step S44 is Yes), the controller 10 returns the processing to Step S40 in FIG. 11, assuming that the subsequent print data is the resent data of the withheld print data.

Moreover, for the subsequent print data, the controller 10 shall execute the processing at Step S23 in FIG. 10 and after.

As described above, such a digital multifunction machine 1 can be realized that, when a time-out occurs after the print data is interrupted during reception of the print data for the plural number of copies, incomplete print data is withheld, and when the print data is resent, incomplete print data is discarded, and printing of complete data is performed, whereby printing of the print data in a plural number of copies in a state different from the user's intention is suppressed more effectively than before.

Embodiment 3

Subsequently, on the basis of FIG. 13 and FIG. 14, an example of processing of print data in the digital multifunction machine 1 of Embodiment 3 of this disclosure will be explained.

The schematic configuration of the image forming system 100 according to Embodiment 3 is similar to that of Embodiment 1 (FIGS. 1 to 3) and thus, explanation will be omitted.

Figure 13:
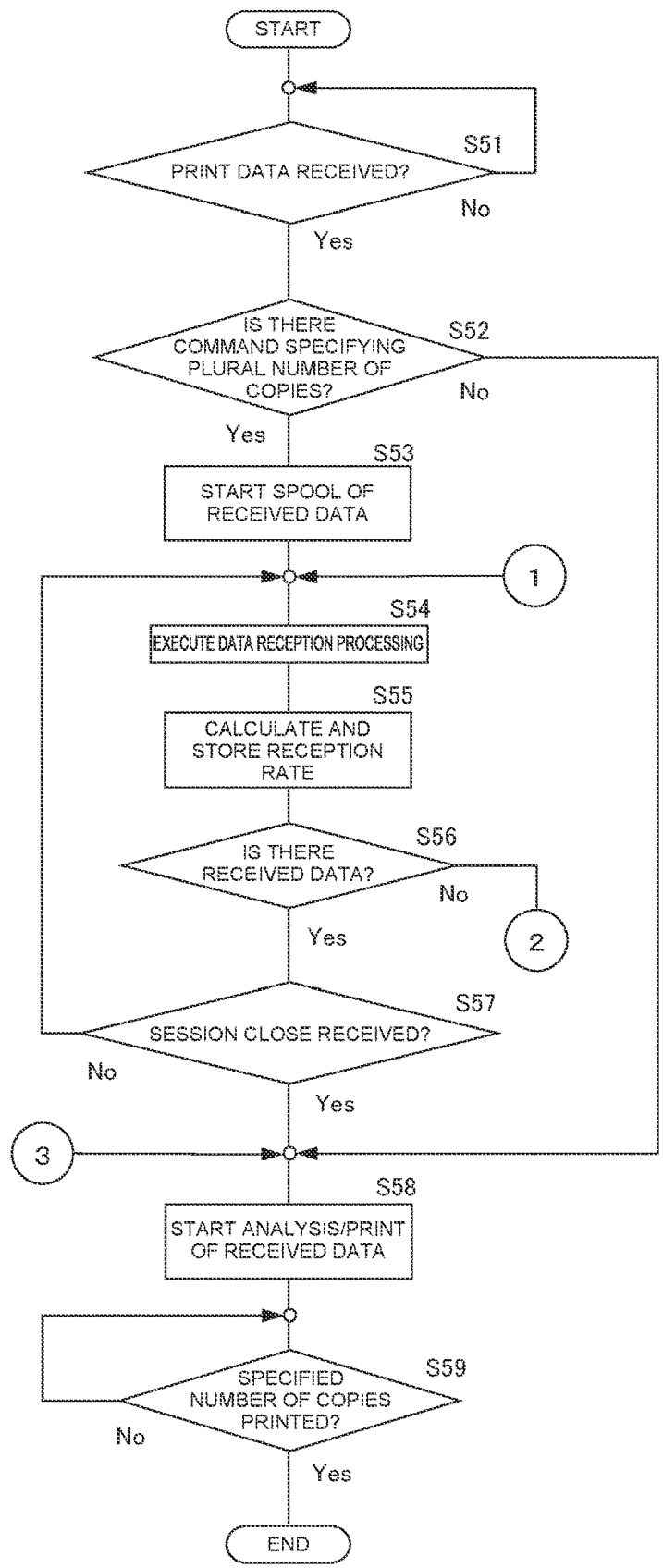
FIG. 13 is a flowchart illustrating the processing of the print data in the digital multifunction machine according to an embodiment 3 of this disclosure.
Figure 14:
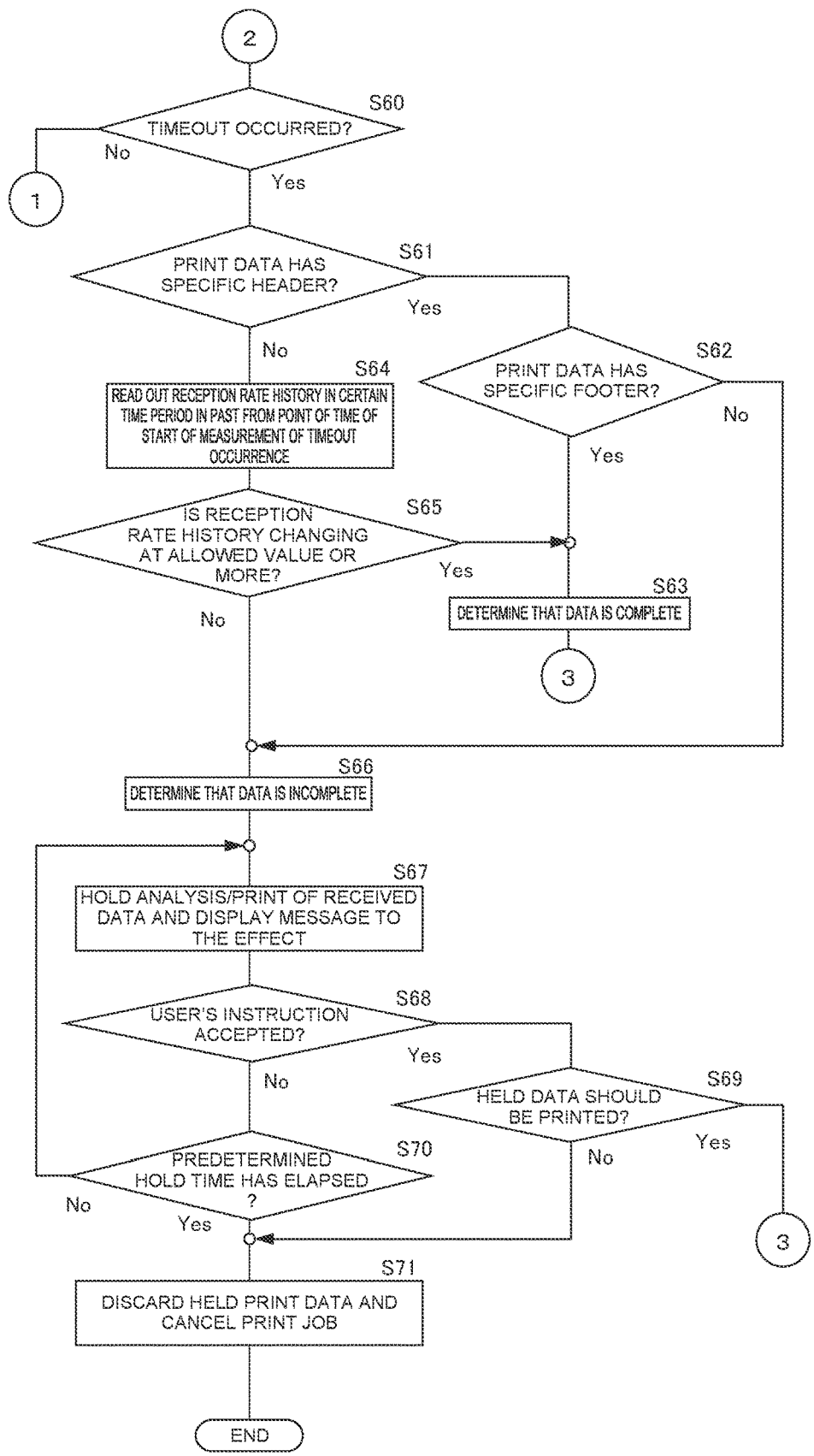
FIG. 14 is a flowchart illustrating the processing of the print data in the digital multifunction machine according to the embodiment 3 of this disclosure.

FIGS. 13 and 14 are flowcharts illustrating the processing of print data in the digital multifunction machine 1 according to Embodiment 3 of this disclosure.

Since processing at Steps S51 to S59 in FIG. 13 and at Steps S60 to S66 in FIG. 14 correspond to the processing at Steps S1 to S9 in FIG. 5 and at Steps S10 to S16 in FIG. 6, respectively, explanation will be omitted.

Here, processing at Step S67 in FIG. 14 and after, which is not described in Embodiment 1, will be explained.

If it is determined that the print data is not complete at Step S66 in FIG. 14, the controller 10 withholds analysis and printing of the received print data and causes a message to that effect to be displayed on the display 171 (Step S67).

At subsequent Step S68, the controller 10 determines whether the operation acceptor 172 has accepted the user's instruction or not (Step S68).

It is determined whether the operation acceptor 172 has accepted the user's instruction or not (Step S68).

If the operation acceptor 172 has not accepted the user's instruction (when the determination at Step S68 is No), at Step S70, the controller 10 determines whether the predetermined holding time has elapsed or not (Step S70).

If the predetermined holding time has not elapsed (when the determination at Step S70 is No), the controller 10 returns the processing to Step S67.

On the other hand, when the predetermined holding time has elapsed (when the determination at Step S70 is Yes), at Step S71, the controller 10 discards the withheld print data, cancels the print job related to the print data (Step S71), and ends the processing.

If the operation acceptor 172 has accepted the user's instruction at Step S68 (when the determination at Step S68 is Yes), at Step S69, the controller 10 determines whether the withheld print data should be printed or not on the basis of the user's instruction (Step S69).

If the withheld print data should be printed (when the determination at Step S69 is Yes), the controller 10 returns the processing to Step S58.

On the other hand, if the withheld print data should not be printed (when the determination at Step S69 is No), at Step S71, the controller 10 discards the withheld print data, cancels the print job related to the print data (Step S71), and ends the processing. By configuring as above, such a digital multifunction machine 1 can be realized that, when a time-out occurs after the print data is interrupted during reception of the print data for the plural number of copies, the printing of the print data in the plural number of copies in a state different from the user's intention is suppressed more effectively than before by withholding the incomplete print data and determining whether the withheld print data should be printed or discarded on the basis of the user's instruction.

Preferred embodiments of the present disclosure also include combinations of any of the plurality of aforementioned modes.

In addition to the aforementioned embodiments, there can be various variations for this disclosure. Such variations should not be construed as falling outside the scope of the present disclosure. The present disclosure should embrace the claims and their equivalents, and all the variations within the scope of the claims.

What is claimed is:

1. An image forming apparatus comprising:
   a communicator that receives a print command of image data from a user terminal via a network;
   an image former that forms an image based on the image data; and
   one or more controllers that control the communicator and the image former, wherein
   when a time-out period set in advance has elapsed without receiving a transmission completion notification of the print command from the user terminal after receiving the print command from the user terminal, the one or more controllers determine whether the image data related to the print command is complete in accordance with a determination procedure set in advance,
   when the one or more controllers determine that the image data is complete, the one or more controllers cause the image former to form the image based on the image data,
   when the one or more controllers determine that the image data is not complete, the one or more controllers withhold an execution of the print command,
   the one or more controllers determine whether the image data related to the print command is complete based on whether the image data includes a specific header and a specific footer set in advance,
   when the image data includes the specific header and the specific footer, the one or more controllers determine that the image data is complete, and
   when the image data does not include the specific footer, the one or more controllers determine that the image data is not complete,
   the image forming apparatus further comprising,
   one or more storages that hold various types of data related to an image formation, wherein
   the one or more controllers calculate a reception rate of the image data related to the print command and cause the one or more storages to hold the reception rate, and
   when the image data does not include the specific header, by referring to a history of the reception rate held in the one or more storages during a predetermined time from a point of time when a measurement of the time-out period is started, the one or more controllers determine that the image data is complete if the reception rate has remained at or above an allowable value set in advance during the predetermined time, and the one or more controllers determine that the image data is not complete if the reception rate has not remained at or above the allowable value during the predetermined time.

2. The image forming apparatus according to claim 1, wherein
   the one or more controllers determine whether a print command received from the user terminal relates to specification of printing of a plural number of copies and when the print command specifies the printing of the plural number of copies and the time-out period has elapsed without receiving the transmission completion notification of the print command from the user terminal, the one or more controllers determine whether the image data is complete in accordance with the determination procedure.

3. The image forming apparatus according to claim 1, wherein
   the one or more controllers cancel the execution of the print command and discard the image data related to the print command after a holding time set in advance has elapsed after the execution of the print command was withheld.

4. The image forming apparatus according to claim 3, wherein
   when the communicator further receives subsequent image data during a period until the holding time has elapsed after the execution of the print command was withheld, the one or more controllers compare the subsequent image data with the image data related to the withheld print command, and if the one or more controllers determine that compared pieces of image data are identical, the one or more controllers discard the image data related to the withheld print command by assuming that the subsequent image data is resent image data and related to the withheld print command, and determine whether the subsequent image data is complete.

5. The image forming apparatus according to claim 1, further comprising:
a display that displays various types of information to a user; and
an operation acceptor that accepts a command from the user, wherein
when the one or more controllers determine that image data related to the print command is not complete, the one or more controllers cause the display to display a message set in advance, and
the operation acceptor accepts the command from the user as to whether the execution of the print command should be canceled.

* * * * *